United States Patent

Koppel et al.

Patent Number: 6,059,233
Date of Patent: May 9, 2000

[54] METHOD AND A SYSTEM FOR LAUNCHING SATELLITES ON NON-COPLANAR ORBITS, MAKING THE USE OF GRAVITATIONAL ASSISTANCE FROM THE MOON

[75] Inventors: Christophe Koppel, Nandy; Dominique Valentian, Rosny, both of France

[73] Assignee: Societe Nationale d'Etude et de Construction de Moteurs d'Aviation, Paris, France

[21] Appl. No.: 09/000,896

[22] Filed: Dec. 30, 1997

[30] Foreign Application Priority Data

Dec. 31, 1996 [FR] France .................................. 96 16275

[51] Int. Cl.$^7$ ...................................................... B64G 1/34
[52] U.S. Cl. ........................................ 244/158 R; 244/172
[58] Field of Search ............................... 244/158 R, 172, 244/164

[56] References Cited

U.S. PATENT DOCUMENTS

| | | |
|---|---|---|
| T100,604 | 5/1981 | Crill et al. . |
| 4,288,051 | 9/1981 | Goschel . |
| 5,054,719 | 10/1991 | Maute . |
| 5,158,249 | 10/1992 | Uphoff . |
| 5,263,666 | 11/1993 | Hubert et al. . |
| 5,393,017 | 2/1995 | Smith et al. . |
| 5,395,076 | 3/1995 | Lichtin et al. . |
| 5,411,226 | 5/1995 | Jones et al. . |
| 5,417,049 | 5/1995 | Sackheim et al. . |
| 5,507,454 | 4/1996 | Dulck . |
| 5,553,816 | 9/1996 | Perrotta . |
| 5,562,266 | 10/1996 | Achkar et al. . |
| 5,681,011 | 10/1997 | Frazier . |

FOREIGN PATENT DOCUMENTS

409721A1  1/1991  European Pat. Off. .

OTHER PUBLICATIONS

Atzei et al., A., "Soho and Cluster: Europe's Possible Contribution to the ISTP" ESA Bulletin, No. 41, Feb. 1985, Paris, France, pp. 21–28.

Andrews, D.G. "Aerobraked Orbital Transfer Vehicle Definition", AIAA–81–0279, Jan. 1989.

*Primary Examiner*—Peter M. Poon
*Assistant Examiner*—Tien Dinh
*Attorney, Agent, or Firm*—Weingarten, Schurgin, Gagnebin & Hayes LLP

[57] ABSTRACT

A first satellite is placed practically directly by a launcher on a first final orbit. A second satellite is placed on the same launcher is initially transferred to a highly elliptical waiting orbit whose semi-major axis points to intercept the torus formed by the sphere of influence of the moon on its orbit, and then during a maneuver at the perigee of the highly elliptical orbit, the second satellite is transferred to lunar transfer orbit. Changes in the perigee altitude and the inclination of an intermediate orbit on which the second satellite is to be found are obtained mainly by gravitational reaction in the sphere of influence of the moon, and during a last maneuver, the second satellite is placed on a final orbit having orbital parameter values that are quite different from those of the orbital parameters of the first final orbit.

11 Claims, 4 Drawing Sheets

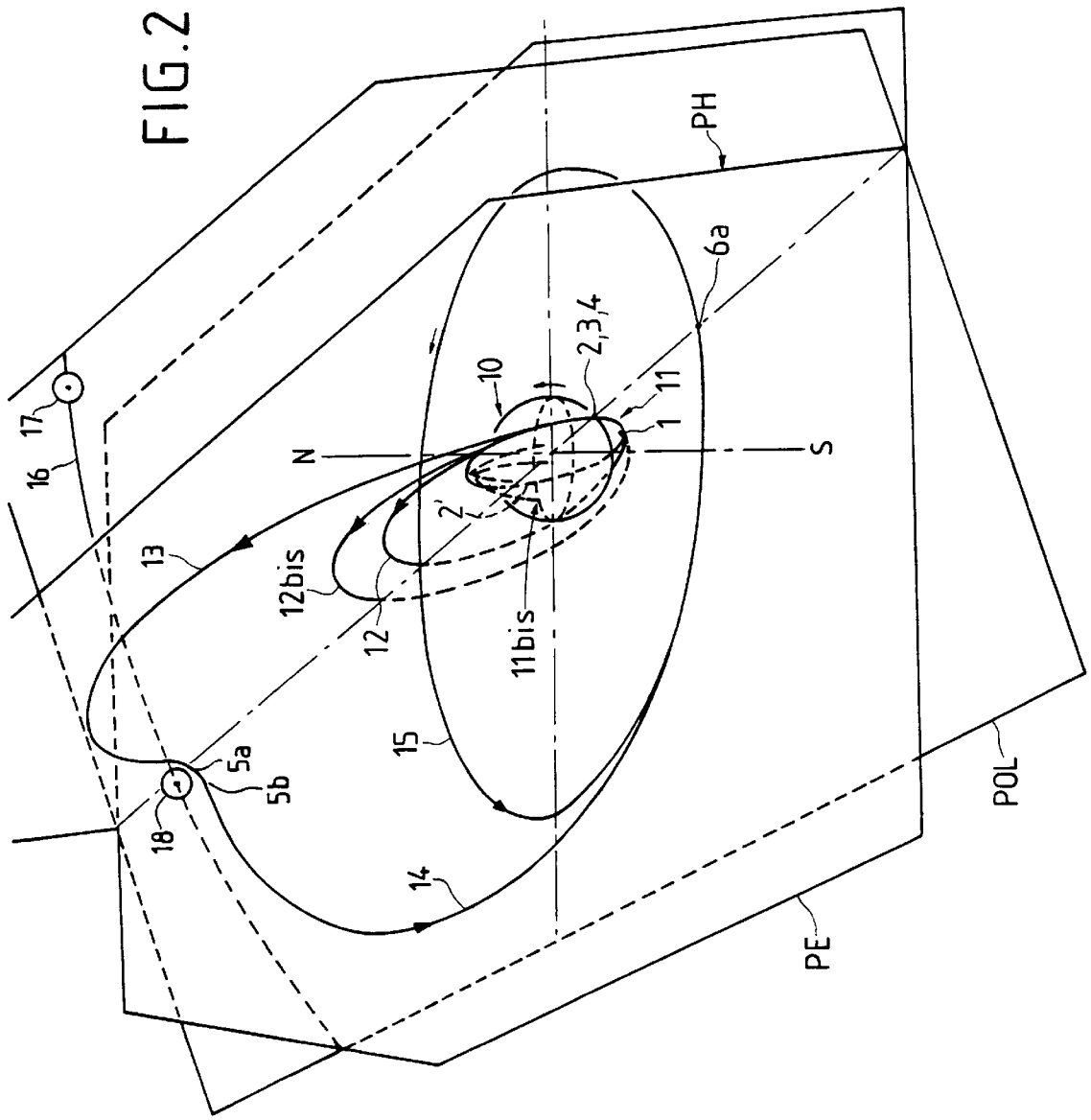

6,059,233

METHOD AND A SYSTEM FOR LAUNCHING SATELLITES ON NON-COPLANAR ORBITS, MAKING THE USE OF GRAVITATIONAL ASSISTANCE FROM THE MOON

FIELD OF THE INVENTION

The present invention relates to a method and to a system for launching satellites simultaneously on non-coplanar orbits, in which a first satellite is put on a launcher adapted to place said first satellite practically directly on a first final orbit having first orbital parameters with a first eccentricity value, a first inclination value, and a first apogee value, and at least one second satellite is put on the launcher for placing on a second final orbit having second orbital parameters with a second eccentricity value, a second inclination value, and a second apogee value which are substantially different from the corresponding values of the first orbital parameters supplied by the launcher and applied to the first satellite launched simultaneously with the second satellite.

PRIOR ART

Double or multiple launches of satellites are generally performed on orbits that are coplanar and of similar eccentricity.

In some cases, such as the second launch of the H-2 launcher, the last stage of the launcher is reignited to place a second satellite on a geostationary transfer orbit, after a first satellite has been placed on a low circular orbit prior to the last stage of the launcher being reignited. Under such circumstances, the orbits of the two satellites placed on the common launcher nevertheless remain practically coplanar.

There exists considerable demand for satellites to be placed on orbits that are not coplanar, in particular for placing a first satellite on a low circular orbit that is inclined, preferable polar, and a second satellite on a geostationary orbit, or indeed to place a plurality of satellites on orbits of very different inclinations (e.g. 0°, 55°, and 65°).

In practice, such missions have not been performed in the past because the cost for performing changes to the inclination of the trajectory of a satellite in low orbit in conventional manner is prohibitive. For example, if it is desired to cause a satellite to pass from a heliosynchronous polar orbit to a low circular equatorial orbit, the speed increment necessary for the satellite is 11 km/s, which is as great as that required, for example, to launch a probe into lunar orbit.

It is also well known to use gravitational assistance for changing the inclination or other orbital parameters of an orbit, in interplanetary missions.

Thus, in the APOLLO missions, "assured return" trajectories were implemented making use of the reaction of the moon's gravity.

The PIONEER 10 and 11 probes made use of reaction from the gravity of the planets Jupiter and Saturn.

The ULYSSES probe made use of reaction from the gravity of Jupiter to obtain a polar orbit around the sun, and the GALILEO probe made use of reaction from the gravity of Venus and of the Earth in order to reach Jupiter.

Thus, gravitational assistance has been used essentially for interplanetary space probes with the direction and the magnitude of the probe velocity vector being modified without significant energy input from a thrust sequence, merely by passing close to a planet which, being characterized by a mass and by a displacement velocity, attracts the space probe, thereby enabling it to take on a new trajectory.

OBJECT AND BRIEF SUMMARY OF THE INVENTION

The invention seeks to enable satellites that are to be placed on non-coplanar orbits to be launched simultaneously and economically.

More particularly, the invention seeks to minimize the energy used by the thrust systems on the satellites which are to be placed in orbit and which have not been placed directly on an orbit close to their final orbit by the launcher which carried the satellites.

These objects are achieved by a method of launching satellites simultaneously on non-coplanar orbits, in which a first satellite is put on a launcher adapted to place said first satellite practically directly on a first final orbit having first orbital parameters with a first eccentricity value, a first inclination value, and a first apogee value, and at least one second satellite is put on the launcher for placing on a second final orbit having second orbital parameters with a second eccentricity value, a second inclination value, and a second apogee value which are substantially different from the corresponding values of the first orbital parameters supplied by the launcher and applied to the first satellite launched simultaneously with the second satellite, wherein, to put the second satellite into place:

the second satellite is transferred to a highly elliptical waiting orbit during a first maneuver, which orbit has its apogee typically situated in the range 50,000 km to 400,000 km, has a semi-major axis pointing so as to intercept the torus formed by the sphere of influence of the moon on its orbit, and has a period TA calculated to comply with the formula:

$$nT_A + \tfrac{1}{2} T_{LTO} = t_{pl} \text{ with n integer} \leq 4$$

where $T_{LTO}$ is the period of the lunar transfer orbit, $t_{pl}$ is the time between the end of launching and the passage of the moon at the aiming point, and n is the number of times, less than 4, that the second satellite travels round the highly elliptical waiting orbit;

at the perigee of said highly elliptical orbit the second satellite is transferred during a second maneuver to the lunar transfer orbit;

a mid-course correction is performed during a third maneuver to fix accurately the entry parameters into the sphere of influence of the moon;

which entry parameters are determined so that during a fourth maneuver, changes are obtained in perigee altitude and in inclination of an intermediate orbit on which the second satellite is to be found for the purpose of coming closer to said second final orbit, which changes are obtained mainly by gravitational reaction in the sphere of influence of the moon; and a fifth maneuver is performed to place the second satellite accurately on the second final orbit.

In a first possible application, said first final orbit on which the first satellite is launched is constituted by an inclined low altitude orbit such as a heliosynchronous orbit, and said fifth maneuver is performed at the perigee of the intermediate orbit of the second satellite exiting the sphere of influence of the moon and consists in lowering apogee or in circularizing said intermediate orbit in order to transform said intermediate orbit into said second final orbit constituted by a geostationary orbit.

In a second possible application, said first final orbit on which the first satellite is launched is constituted by a geostationary transfer orbit of low inclination, or a supergeostationary transfer orbit (which first final orbit is not the nominal orbit of the first satellite), and during said third maneuver, the mid-course correction is such that the entry parameters into the sphere of influence of the moon make it possible, after gravitational reaction in the sphere of influence of the moon, for the perigee of the intermediate orbit on which the second satellite is to be found to be situated at an altitude of 80 km to 170 km; and the fifth maneuver consists, on leaving the sphere of influence of the moon and with perigee altitude fixed, in performing atmospheric braking at least once to lower the apogee of the intermediate orbit of the second satellite; and then, by a maneuver at apogee, in raising its perigee so as to transform said intermediate orbit into said second final orbit constituted by an inclined low altitude orbit or an inclined low circular orbit.

In a third possible application, the invention provides a method for launching a plurality of second satellites simultaneously on final orbits constituted by low altitude orbits, in particular low circular orbits of different inclinations, while the first satellite is placed on a first final orbit constituted by a geostationary transfer orbit of small inclination, or by a supergeostationary transfer orbit, wherein, during the third maneuver, a series of different mid-course corrections are performed to place the various second satellites on different entry points into the sphere of influence of the moon, so as to aim for different inclinations, and consequently obtain, during the fifth maneuver and after atmospheric braking, a series of low altitude orbits, in particular low circular orbits of different inclinations for the various satellites in the plurality of second satellites.

The invention also provides a launch system for implementing the above-mentioned method, the system comprising a launcher, a first satellite disposed on the launcher which is adapted to place said first satellite practically directly on a first final orbit, and at least one second satellite for placing on a second final orbit different from said first final orbit, and the second satellite is fitted with an on-board computer, and a chemical thrust system comprising a main thruster on board said second satellite and attitude control thrusters.

According to a particular characteristic, said second satellite includes a star sensor, a variable field earth sensor, and an ephemeris table included in the on-board computer enabling angles to be calculated between the thrust vector and the earth-satellite direction and the sun-satellite direction, and thus to determine the attitude of the second satellite during the maneuvers.

Said second satellite may also include gyros controlling the attitude control thrusters to put the body of the second satellite into rotation for pointing the main thruster in the aiming direction.

The invention also provides a launch system for implementing the above-mentioned method, the system comprising a launcher, a first satellite disposed on the launcher which is adapted to place said first satellite practically directly on a first final orbit, and at least one second satellite for placing on a second final orbit different from said first final orbit, and the second satellite is fitted with an on-board computer, and also an electrical thrust system comprising at least high specific impulse electrical thrusters on board said second satellite, which electrical thrusters may be of the ion type, the arc Jet type, or the closed electron drift type.

In a particular embodiment, the second satellite includes a variable field earth horizon sensor for obtaining the position of the earth, and reaction wheels for determining the attitude of said second satellite, and the on-board computer implements a relationship for controlling the electrical thrusters which consists in stabilizing the thrust vector perpendicularly to the earth-satellite direction.

In another particular embodiment, the second satellite includes a star sensor and an ephemeris table included in the on-board computer to determine the attitude of said second satellite, and reaction wheels for controlling the attitude of said second satellite, and the on-board computer implements a control relationship for the electrical thrusters which consists in pointing the thrust vector in an inertial direction.

Advantageously, the body of the second satellite is provided with at least two laser retro-reflectors making it possible to use laser telemetry to obtain very accurately the position of said second satellite before the mid-course correction maneuvers in the third maneuver.

Both a chemical thrust system and an electrical thrust system can be installed on the same satellite.

BRIEF DESCRIPTION OF THE DRAWINGS

Other characteristics and advantages of the invention appear from the following description of particular embodiments of the invention, given as examples, and with reference to the accompanying drawings, in which:

FIG. 2 is a diagram showing an example of the method of the invention for placing a first satellite on a heliosynchronous orbit and placing a second satellite which is transferred from the heliosynchronous orbit to a geostationary orbs;

DETAILED DESCRIPTION OF PARTICULAR EMBODIMENTS OF THE INVENTION

Figure 1A:
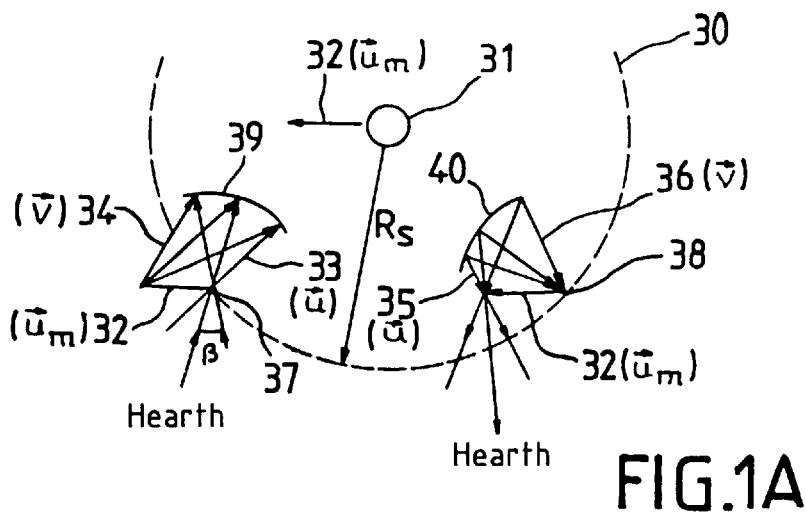
FIG. 1A is a diagram showing the velocity components giving the velocity vector of a satellite in lunar coordinates on entering the sphere of influence of the moon, and the velocity components giving the velocity vector of the same satellite in terrestrial co-ordinates on leaving the sphere of influence of the moon.

Reference is made initially to FIG. 1A which shows the moon 31 with its sphere of influence 30 of radius $R_S$, a point of entry 37 into said sphere of influence 30 for a satellite placed on a lunar transfer orbit (LTO) and an exit point 38 for said satellite from the sphere of influence 30. Reference 32 designates the velocity vector of the moon $\bar{u}_m$.

On entry 37 into the sphere of influence 30, the velocity vector 32 of the moon combines with the velocity vector $\bar{u}$ 33 of the satellite relative to the earth, to give a velocity vector $\bar{v}$ 34 for the satellite in lunar coordinates. Reference 39 designates the spherical limit taken into consideration for combining the vectors 32, 33, and 34.

On exit 38 from the sphere of influence 30, the velocity vector 32 of the moon combines with the velocity vector $\bar{v}$ 36 of the satellite referenced to the moon to give the satellite a velocity vector $\bar{u}$ 35 in terrestrial coordinates. Reference 40 designates the spherical limit taken into account for combining the vectors 32, 35, and 36.

As a function of the entry point 37 of the satellite into the sphere of influence 30 of the moon, it is thus possible to determine the characteristics of the velocity vector 35 of the satellite on exit 38 from the sphere of influence 30 of the moon, and thus to determine the variation produced in the inclination of the satellite's orbit, and also the variations of its other orbital parameters. Methods of numerically integrating the fundamental dynamics equation enable these characteristics to be determined accurately.

Figure 1B:
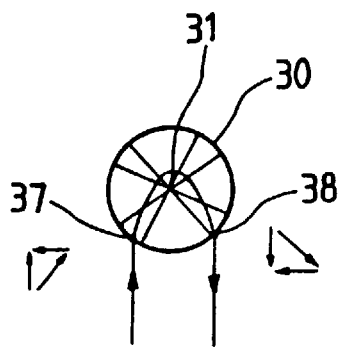
FIGS. 1B, 1C, and 1D are diagrams showing various examples of possible trajectories for a satellite into and out from the sphere of influence of the moon.
Figure 1C:
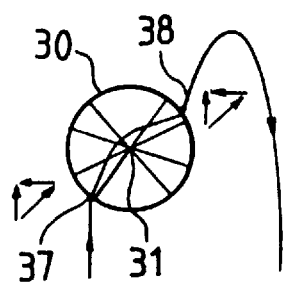
Figure 1D:
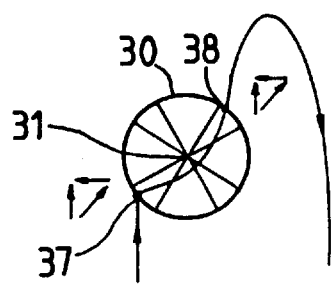

FIGS. 1B, 1C, and 1D show three examples of trajectories for a satellite placed on a lunar transfer orbit and penetrating into the sphere of influence 30 of the moon 31. In FIG. 1B, the satellite is shown having a trajectory that is very tight around the moon, whereas FIGS. 1C and 1D show examples of trajectories that are looser, giving rise to an apogee outside the sphere of influence 30 of the moon 31.

FIGS. 1A to 1D thus serve to explain steps implemented the method of the present invention whereby gravitational assistance can be obtained on launching a satellite if the satellite is placed on a lunar transfer orbit (LTO), with the inclination of the orbit being selectable as a function of the point of entry into the sphere of influence of the moon.

A first implementation of the method of the invention is described with reference to FIG. 2.

Two satellites A and B are installed on the same launcher which is adapted to place both satellites A and B on a heliosynchronous orbit 11 around the earth 10.

The first satellite B is released at point 1 on the heliosynchronous orbit 11. If necessary, the satellite B can be allowed to drift by natural precession onto a waiting orbit 11*bis*. The satellite B is then placed directly by the launcher on an inclined circular orbit which corresponds to the looked-for final orbit and which does not require a large amount of energy in order to be transformed into the looked-for nominal orbit.

The second satellite A can be associated with the top stage of the launcher. When the launcher passes through one (2) of the two points of intersection 2, 2' with the orbital plane POL of the moon, the launcher delivers an impulse to satellite A which puts satellite A onto an elliptical orbit 12. At the same time, satellite A is separated from the top stage of the launcher. A main thruster of the satellite, such as a chemical thruster, is ignited when the satellite returns to the vicinity of a point 3 which corresponds to point 2 and constitutes the perigee of the elliptical orbit 12, thereby putting satellite A on a waiting orbit 12*bis* of period $T_A$ as defined below, while the moon is itself in a position 17 on its orbit 16. The main thruster of satellite A is ignited a second time in the vicinity of a point 4 at the intersection of the waiting orbit 12*bis* with the lunar orbital plane, constituting the perigee of the waiting orbit 12*bis*, thereby placing satellite A on a lunar transfer orbit 13. When satellite A is at the apogee of its lunar transfer orbit 13, it is subjected in a zone 5*a* to the gravitational reaction of the moon which has reached position 18. This gravitational reaction, possibly associated with a correction impulse generated by the thrust system of satellite A in a zone 5*b* creates a velocity increment mostly outside the orbital plane and causes satellite A to be transferred onto a lunar transfer orbit 14 situated in the equatorial plane PE. The perigee of this orbit 14 is situated at point 6*a* at an altitude that is close to 36,000 km. A braking impulse can then easily be applied to satellite A at point 6*a*, using its main engine, thereby reducing the altitude of the apogee and transferring satellite A onto the geostationary orbit (GSO) 15. The apogee altitude of satellite A can be lowered until geostationary orbit 15 is reached, either by a braking impulse generated by the chemical thrust system of satellite A at perigee 6*a*, or else by continuous braking using an electrical thrust system of satellite A, in association with an appropriate relationship for pointing the thrust vector.

Figure 3:
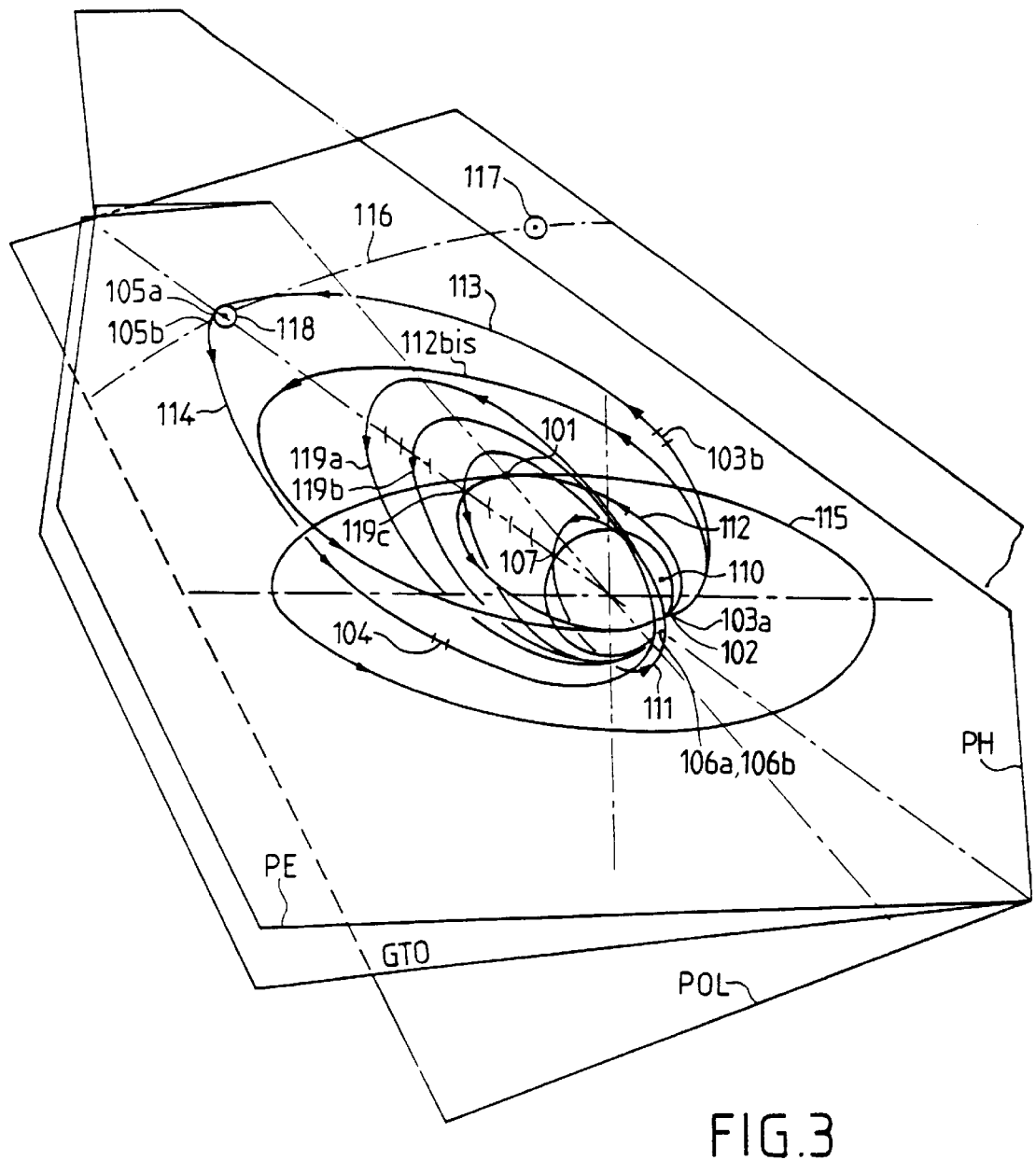
FIG. 3 is a diagram showing another example of the method of the invention for placing a first satellite on a geostationary orbit and placing a second satellite which is transferred from said geostationary orbit to a heliosynchronous orbit.

Another implementation of the method of the invention is described with reference to FIG. 3, in which two satellites A and B are placed on the same launcher which is adapted to place both satellites on a geostationary transfer orbit 112 about the earth 110. Satellite B is released at a point on said orbit for subsequent placing by its own means in the vicinity of point 101 on a geostationary orbit 115. Satellite A, which may be connected to the top stage of the launcher, receives from the launcher, on passing through perigee 102, an impulse that puts the satellite on an elliptical waiting orbit 112*bis* of period $T_A$, as defined below. In a variant implementation, satellite A is merely separated from the launcher and a chemical type main thrust system of satellite A is ignited in zone 103. The impulse supplied by the satellite thruster then places the satellite on waiting orbit 112*bis*. The moon is then in position 117 on its orbit 116. The main thruster of satellite A is ignited for a first or second time as the case may be at perigee, thereby placing satellite A on the lunar transfer orbit 113.

Satellite A may be subjected to a mid-course correction in zone 103*b* in order to refine its entry parameters into the sphere of influence of the moon.

When satellite A is at apogee, it is subjected in zone 105*a* to the gravitational reaction of the moon which is now in position 118. This gravitational reaction may optionally be associated with a corrective impulse 105*b* which transfers satellite A onto a lunar transfer orbit 114 situated in the heliosynchronous plane PH, or the plane of some other intended low circular orbit. The perigee of this orbit is situated at an altitude lying in the range 80 km to 170 km. In order to refine altitude at perigee, it may be necessary to perform a mid-course correction in zone 104.

Thereafter, subsequent passes through perigee 106*a*, 106*b*, are allowed to decrease the apogee of the orbit in question 119*a*, 119*b*, 119*c*, until an orbit is obtained having its apogee that is typically less than 1000 km. In a terminal maneuver, the thrust system of satellite A delivers an impulse at apogee 107 to circularize the orbit 111 which may be heliosynchronous or inclined.

Thus, in the implementation described with reference to FIG. 3, the first satellite B is placed on a transfer orbit 113 of small inclination while the second satellite A is placed on a transfer orbit 112*bis* that is highly eccentric, or else directly on an LTO 113 having the same inclination.

The entry parameters into the sphere of influence of the moon are selected so as to enable the inclination of the orbit of satellite A to be changed, and so as to enable an appropriate modification of altitude at perigee, by gravitational reaction. A small trajectory correction makes it possible to decrease perigee altitude slightly.

Apogee is reduced by successive passes through the upper atmosphere, and the orbit is circularized by an impulse generated, for example, by a chemical thruster on satellite A.

According to an important characteristic of the invention, regardless of the implementation under consideration, the constraints of celestial mechanisms and of launching are harmonized.

Thus, to benefit from the assistance of the moon's gravity to change inclination, two conditions must be satisfied:

the moon must be situated close to the intersection between the orbital planes of the initial orbit and of the intended orbit; and passage of the satellite must be synchronized with passage of the moon.

For the condition that the orbital planes intersect, it is known that the plane of the moon's orbit is inclined at 5° relative to the plane of the ecliptic, while the equatorial plane (the geostationary orbital plane) is itself inclined at 23°30' to the plane of the ecliptic. In addition, the intersections between the three planes constituted by the lunar plane, the initial orbital plane, and the final orbital plane, do not coincide as a general rule.

Fortunately, there is no need to aim exactly for the intersection of the equatorial plane and of the lunar orbital plane. A residual inclination of a few degrees is acceptable since it can be eliminated by a correction impulse at apogee or at the node. That corresponds to a right ascension window of a few tens of degrees.

According to the invention, all that is required is that the semi-major axis of the starting orbit should be at a few tens of degrees from the intended ideal point.

Concerning the condition for passage of the satellite to be synchronized with passage of the moon, it can be observed that the time required to describe half a lunar transfer orbit is about 7 days. This means that in theory the satellite should be injected onto said orbit 7 days before overflying the moon and into an appropriate region of space (in the vicinity of the intersection between the initial orbital plane and the lunar orbital plane). Such a condition would give rise to unacceptable constraints on the date and time of a common launch.

Thus, one of the essential characteristics of the invention is to make use of a waiting orbit that is very elliptical, having a period $T_A$ that is selected in such a manner that:

$$nT_A + \tfrac{1}{2}T_{LTO} = t_{p1} \ (n \text{ integer} \leq 4)$$

where:

$t_{pl}$ is the time between the instant of ignition and the passage of the moon in the vicinity of the equatorial plane of the earth;

$T_{LTO}$ is the period of the lunar transfer orbit LTO; and n is the number of times the satellite travels round the highly elliptical waiting orbit.

It is thus possible to decouple requirements concerning launch time and satellite-moon rendezvous. Also, since the satellite travels round the elliptical orbit only n types with $n \leq 4$, the number n of passes through the Van Allen belts is less than four.

At the price of a moderate speed increment, which can be obtained by means of a low power thrust system incorporated in the satellite to be put into orbit, the method of the invention makes it possible to perform changes of orbital plane that cannot be achieved directly by means of chemical thrust systems performing a conventional transfer, given the need to limit on-board mass.

Table 1 below gives, in km/s, the speed increments necessary firstly for a conventional transfer and secondly for a transfer in accordance with the method of the invention, for various examples of changing between orbits whose planes do not coincide. In the transfer of the invention, the speed increment supplied by gravitational reaction is not shown, since by definition that does not require any on-board fuel to be consumed, even if it does contribute substantially to transferring orbit.

TABLE 1

A comparison of speed increments in a conventional transfer and in a transfer of the invention (in km/s)

|  | Conventional transfer | Transfer of the invention |
|---|---|---|
| Heliosynchronous orbit/GSO | 6 | 3 + 1 |
| GTO/heliosynchronous orbit (or circular orbit of arbitrary inclination) | 4.7 | 0.7 + 0.2 |
| 60° change of inclination (between low circular orbits) | 7.5 | 3 + 0.1 |
| GTO/interplanetary orbit | 0.7 | 0.6 |

In a particular implementation of the invention it is possible, with electrical thrust only, to place a satellite in geostationary orbit starting from an LTO. Under such circumstances, exposure of the satellite to the Van Allen belts is practically eliminated. However, if it were desired to use conventional methods of passing directly from a geostationary transfer orbit GTO to a geostationary orbit GSO using electrical thrust, then it would be necessary to cross the Van Allen belts many times, and that would be highly damaging.

The method of the invention makes it possible not only to use a single launcher to put two different satellites onto non-coplanar orbits, but also to launch in addition to a satellite B that is placed on a geostationary orbit, a constellation of satellites A, C, D, and E that are placed simultaneously on orbits of different inclinations. Under such circumstances, the satellites A, C, D, and E are launched on a substantially equatorial lunar transfer orbit. A mid-course correction is performed separately for each of the satellites A, C, D, and E, enabling each satellite to aim for a different entry point into the sphere of influence of the moon, thereby producing a different change of inclination.

A second mid-course correction, on the return half-orbit enables the altitude of each perigee to be adjusted. The orbit is circularized by atmospheric braking (aerobraking) and by a corrective impulse as for satellite A that is put into place using the process illustrated in FIG. 3.

It may be observed that in general, to pass from a geostationary transfer orbit to a low circular orbit in accordance with the invention, the passage from a geostationary transfer orbit to a lunar transfer orbit requires the launcher to provide only a very small speed increment, as already emphasized, of the order of 700 m/s, even though the increase in apogee altitude is considerable (from 36,000 km to 360,000 km or 380,000 km, approximately).

Also, to transfer an elliptical orbit into a low circular orbit, it is not necessary to supply a large braking increment. Atmospheric braking (aerobraking) at perigee makes it possible, by successive passes through the upper atmosphere, to reduce altitude at apogee with minimum expenditure of propellent (which is required only to provide a few corrective impulses). In addition, if heat flux on passing through the atmosphere is limited to 6 kW/m$^2$, there is no need for any special thermal protection.

Figure 4:
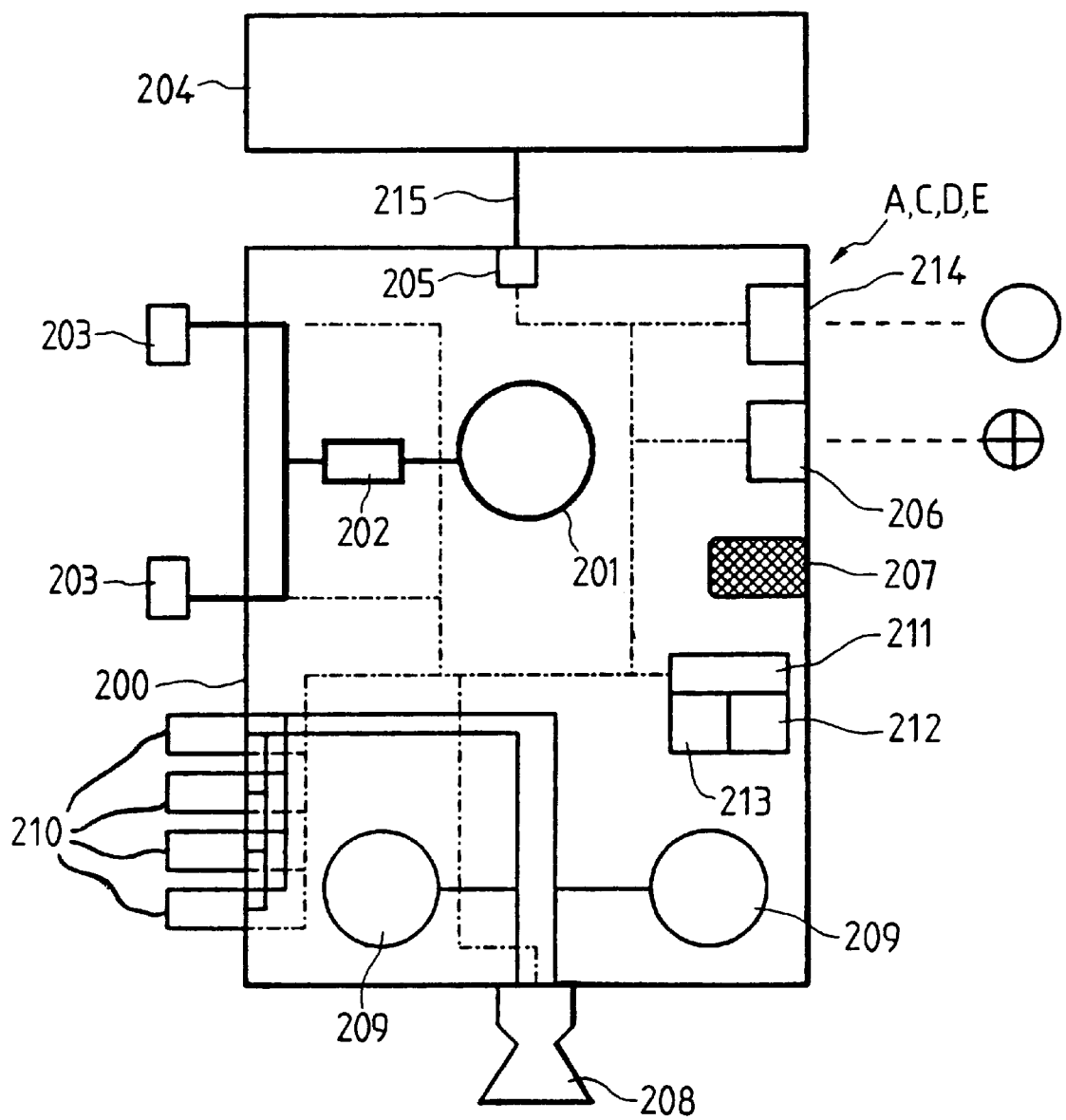
FIG. 4 is a block diagram of an example of the on-board configuration of a satellite that is suitable for performing an orbit transfer by the method of the invention.

There follows, with reference to FIG. 4, a description of an example of a satellite launch system for implementing the invention.

A conventional launcher, not shown in the drawings, is associated with a first satellite B and with at least one second satellite A, an example of which is shown in FIG. 4. The launcher is adapted to place the first satellite B practically directly on its final orbit, so said satellite B can be entirely conventional including only correctional thrust means for supplying small trajectory-correcting impulses.

The second satellite A (which must be capable of performing various maneuvers after separating from the launcher and prior to reaching its final orbit) includes an on-board computer 211 associated with a clock 212 and data processing means 213 fitted with memories and serving to determine astronomical ephemeris for automatic piloting.

Satellite A is fitted with a thrust system that may be of chemical or of electrical type. FIG. 4 shows the case of a satellite A having both types of thrust system.

Thus, the body of the satellite 200 contains at least one xenon tank 201 feeding at least two electrical thrusters 203 via an expander/filter/valve assembly 202, which thrusters may be of the ion type having closed electron drift, or else may be of the arc jet type. Electrical power is provided by at least one solar panel 204 powering the satellite via an arm 215 and a rotary mechanism 205.

The satellite may advantageously receive two laser reflectors 207 situated on two opposite faces enabling the distance of the satellite to be determined very accurately either relative to the earth, or relative to the moon (which has on its surface laser reflectors originally intended for space experiments, in the APOLLO and LUNAKHOD missions), thereby making it possible to aim very accurately into the corridor for passing into the sphere of influence of the moon or the inlet corridor for atmospheric braking (aerobraking).

The satellite may also receive a chemical thrust system (e.g. a hydrazine system or a two-propellent system) comprising at least one thruster 208 whose thrust (several hundreds of Newtons) is capable of providing speed increments that are substantially in impulse form, associated with one or more propellent tanks 209, and attitude control thrusters 210 associated with gyros.

The satellite also includes a variable field earth sensor 206 and at least one star sensor 214 (sun sensor or star sensor) providing two angular coordinates.

The star sensor 214 and the variable field earth sensor 206 in association with the ephemeris table included in the on-board computer 211 serve to compute angles between the thrust vector and the earth-satellite and sun-satellite directions, and thus to determine the attitude of the satellite A while it is maneuvering.

The gyros control the attitude control thrusters 210 which rotate the body of the second satellite so as to point the main thruster 208 in the aiming direction.

The on-board computer 211 controls both thrust systems.

In a first embodiment, the variable field earth horizon sensor 206 makes it possible to obtain the position of the earth, and reaction wheels maintain the attitude of the satellite A. The on-board computer 211 implements a relationship for controlling the electrical thrusters 203 which consist in stabilizing the thrust vector perpendicularly to the earth-satellite direction.

In another embodiment, the star sensor 214 and the ephemeris table included in the on-board computer 211 serve to determine the attitude of satellite A. Reaction wheels control satellite attitudes The on-board computer 211 implements a control relationship for the electrical thrusters which consist in pointing the thrust vector along an inertial direction.

What is claimed is:

1. A method of launching satellites simultaneously on non-coplanar orbits, in which a first satellite is put on a launcher adapted to place said first satellite practically directly on a first final orbit having first orbital parameters with a first eccentricity value, a first inclination value, and a first apogee value, and at least one second satellite is put on the launcher for placing on a second final orbit having second orbital parameters with a second eccentricity value, a second inclination value, and a second apogee value which are substantially different from the corresponding values of the first orbital parameters supplied by the launcher and applied to the first satellite launched simultaneously with the second satellite, wherein, to put the second satellite into place: the second satellite is transferred to a highly elliptical waiting orbit during a first maneuver, which orbit has its apogee typically situated in the range 50,000 km to 400,000 km, has a semi-major axis pointing so as to intercept the torus formed by the sphere of influence of the moon on its orbit, and has a period $T_A$ calculated to comply with the formula:

$$nT_A + \tfrac{1}{2}T_{LTO} = t_{pl} \text{ with n integer} \leq 4$$

where $T_{LTO}$ is the period of the lunar transfer orbit, $t_{pl}$ is the time between the end of launching and the passage of the moon at the aiming point, and n is the number of times, less than 4, that the second satellite travels round the highly elliptical waiting orbit; at the perigee of said highly elliptical orbit the second satellite is transferred during a second maneuver to the lunar transfer orbit; a mid-course correction is performed during a third maneuver to fix accurately the entry parameters into the sphere of influence of the moon; which entry parameters are determined so that during a fourth maneuver, changes are obtained in perigee altitude and in inclination of an intermediate orbit on which the second satellite is to be found for the purpose of coming closer to said second final orbit, which changes are obtained mainly by gravitational reaction in the sphere of influence of the moon, and a fifth maneuver is performed to place the second satellite accurately on the second final orbit.

2. A method according to claim 1, wherein said first final orbit on which the first satellite is launched is constituted by an inclined low altitude orbit such as a heliosynchronous orbit, and wherein said fifth maneuver is performed at the perigee of the intermediate orbit of the second satellite exiting the sphere of influence of the moon and consists in lowering apogee or in circularizing said intermediate orbit in order to transform said intermediate orbit into said second final orbit constituted by a geostationary orbit.

3. A method according to claim 1, wherein said first final orbit on which the first satellite is launched is constituted by a geostationary transfer orbit of low inclination, or a supergeostationary transfer orbit, and wherein, during said third maneuver, the mid-course correction is such that the entry parameters into the sphere of influence of the moon make it possible, after gravitational reaction in the sphere of influence of the moon, for the perigee of the intermediate orbit on which the second satellite is to be found to be situated at an altitude of 80 km to 170 km; and wherein the fifth maneuver consists, on leaving the sphere of influence of the moon and with perigee altitude fixed, in performing atmospheric braking at least once to lower the apogee of the intermediate orbit of the second satellite; and then, by a maneuver at apogee, in raising its perigee so as to transform said intermediate orbit into said second final orbit constituted by an inclined low altitude orbit or an inclined low circular orbit.

4. A method according to claim 3, for launching a plurality of second satellites simultaneously on final orbits constituted by low altitude orbits, in particular low circular orbits of different inclinations, while the first satellite is placed on a first final orbit constituted by a geostationary transfer orbit of small inclination, or by a supergeostationary transfer orbit, wherein, during the third maneuver, a series of different mid-course corrections are performed to place the various second satellites on different entry points into the sphere of influence of the moon, so as to aim for different inclinations, and consequently obtain, during the fifth maneuver and after atmospheric braking, a series of low altitude orbits, in particular low circular orbits of different inclinations for the various satellites in the plurality of second satellites.

5. A system for launching satellites to implement the method of claim 1, the system comprising a launcher, a first satellite disposed on the launcher which is adapted to place said first satellite practically directly on a first final orbit, and at least one second satellite for placing on a second final orbit different from said first final orbit, and the second satellite is fitted with an on-board computer, and a chemical thrust system comprising a main thruster on board said second satellite and attitude control thrusters.

6. A system for launching satellites to implement the method of claim 1, the system comprising a launcher, a first satellite disposed on the launcher which is adapted to place said first satellite practically directly on a first final orbit, and at least one second satellite for placing on a second final orbit different from said first final orbit, and the second satellite is fitted with an on-board computer, and also an electrical thrust system comprising at least high specific impulse electrical thrusters on board said second satellite, which electrical thrusters may be of the ion type, the arc jet type, or the closed electron drift type.

7. A system according to claim 5, wherein said second satellite includes a star sensor, a variable field earth sensor, and an ephemeris table included in the on-board computer enabling angles to be calculated between the thrust vector and the earth-satellite direction and the sun-satellite direction, and thus to determine the attitude of the second satellite during the maneuvers.

8. A system according to claim 7, wherein said second satellite also includes gyros controlling the attitude control thrusters to put the body of the second satellite into rotation for pointing the main thruster in the aiming direction.

9. A system according to claim 5, wherein the body of the second satellite is provided with at least two laser retro-reflectors making it possible to use laser telemetry to obtain very accurately the position of said second satellite before the mid-course correction maneuvers in the third maneuver.

10. A system according to claim 6, wherein the second satellite includes a variable field earth horizon sensor for obtaining the position of the earth, and reaction wheels for determining the attitude of said second satellite, and wherein the on-board computer implements a relationship for controlling the electrical thrusters which consists in stabilizing the thrust vector perpendicularly to the earth-satellite direction.

11. A system according to claim 6, wherein the second satellite includes a star sensor and an ephemeris table included in the on-board computer to determine the attitude of said second satellite, and reaction wheels for controlling the attitude of said second satellite, and wherein the on-board computer implements a control relationship for the electrical thrusters which consists in pointing the thrust vector in an inertial direction.

* * * * *

UNITED STATES PATENT AND TRADEMARK OFFICE
CERTIFICATE OF CORRECTION

PATENT NO. : 6,059,233
DATED : May 9, 2000
INVENTOR(S) : Christophe Koppel et al.

It is certified that error appears in the above-identified patent and that said Letters Patent is hereby corrected as shown below:

Column 2,
Line 31, "TA" should read -- $T_A$ --; and

Column 4,
Line 36, "orbs;" should read -- orbit; --.

Signed and Sealed this

Ninth Day of April, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.   : 6,059,233
DATED        : May 9, 2000
INVENTOR(S)  : Christophe Koppel et al.

It is certified that error appears in the above-identified patent and that said Letters Patent is hereby corrected as shown below:

Column 2,
Line 31, "TA" should read -- $T_A$ --; and

Column 4,
Line 36, "orbs;" should read -- orbit; --.

This certificate supersedes the Certificate of Correction issued April 9, 2002, since this patent number did not appear on the Certificate of Correction listing for April 9, 2002.

Signed and Sealed this

Thirtieth Day of April, 2002

Attest:

JAMES E. ROGAN
Attesting Officer  Director of the United States Patent and Trademark Office